United States Patent
Lew

(10) Patent No.: US 9,550,394 B2
(45) Date of Patent: Jan. 24, 2017

(54) BICYCLE WHEELS WITH ASYMMETRIC CARBON FIBER RIMS

(71) Applicant: REYNOLDS CYCLING, LLC, Sandy, UT (US)

(72) Inventor: Paul E. Lew, Las Vegas, NV (US)

(73) Assignee: REYNOLDS CYCLING, LLC, Sandy, UT (US)

(*) Notice: Subject to any disclaimer, the term of this patent is extended or adjusted under 35 U.S.C. 154(b) by 138 days.

(21) Appl. No.: 14/226,647

(22) Filed: Mar. 26, 2014

(65) Prior Publication Data
US 2014/0292061 A1    Oct. 2, 2014

Related U.S. Application Data

(60) Provisional application No. 61/805,593, filed on Mar. 27, 2013, provisional application No. 61/856,239, filed on Jul. 19, 2013.

(51) Int. Cl.
*B60B 21/02* (2006.01)
*B60B 1/00* (2006.01)
*B60B 5/02* (2006.01)

(52) U.S. Cl.
CPC ........... *B60B 21/023* (2013.01); *B60B 21/025* (2013.01); *B60B 1/003* (2013.01); *B60B 5/02* (2013.01); *B60B 2900/311* (2013.01); *B60B 2900/323* (2013.01); *Y10T 156/1002* (2015.01)

(58) Field of Classification Search
CPC ...... B60B 21/023; B60B 21/025; B60B 21/10; B60B 21/104; B60B 5/02; B60B 21/106; B60B 1/003; B60B 1/041
See application file for complete search history.

(56) References Cited

U.S. PATENT DOCUMENTS

| | | | |
|---|---|---|---|
| 6,126,242 A * | 10/2000 | Chen | B60B 21/062 188/26 |
| 7,614,706 B2 * | 11/2009 | Meggiolan | B29C 70/446 301/95.102 |
| 7,950,747 B2 | 5/2011 | Mercat et al. | |
| 2003/0085610 A1 | 5/2003 | Addink et al. | |
| 2007/0063574 A1 | 3/2007 | Mercat et al. | |
| 2008/0054711 A1 | 3/2008 | Dal Pra et al. | |
| 2011/0084543 A1 * | 4/2011 | Lew | B29C 70/44 301/95.102 |
| 2011/0272999 A1 | 11/2011 | Roncali | |
| 2013/0049441 A1 | 2/2013 | Smart | |

* cited by examiner

*Primary Examiner* — John Walters
*Assistant Examiner* — James Triggs
(74) *Attorney, Agent, or Firm* — Fabian Vancott; Steven Nichols

(57) ABSTRACT

A bicycle wheel includes a hub. The wheel also includes a fully asymmetric carbon fiber rim. The carbon fiber rim includes a curved sidewall and a straight sidewall, the straight sidewall being thicker than the curved sidewall. The wheel also includes a number of symmetric left and right spokes connecting the hub to the rim.

16 Claims, 12 Drawing Sheets

|  | .3472 inch offset wall thickness ratio | | | .2 inch offset wall thickness ratio | | | |
| --- | --- | --- | --- | --- | --- | --- | --- |
| Rim (201) | curved sidewall (208-2) | add ply thickness in inches | straight sidewall (208-1) | additional plies of carbon on straight sidewall (208-1) | curved sidewall thickness (208-2) | add ply thickness in inches | straight sidewall (208-1) | additional plies of carbon on straight sidewall (208-1) |
| Rim "A" | 0.017 | .0196 - .0245 | .0366 - .0415 | 4-5 | | .0098 - .0147 | .0268 - .0317 | 2-3 |
| Rim "B" | 0.017 | .0147 - .0196 | .0317 - .0366 | 3-4 | 0.017 | .0049 - .0098 | .0219 - .0268 | 1-2 |
| Rim "C" | 0.017 | .0147 - .0158 | .0317 - .0328 | 3-4 | 0.017 | .0049 - .0098 | .0219 - .0268 | 1-2 |
| Rim "D" | 0.017 | .0098 - .0125 | .0268 - .0295 | 2-3 | 0.017 | .0049 - .007 | .0219 - .0240 | 1-2 |

*Fig. 3*

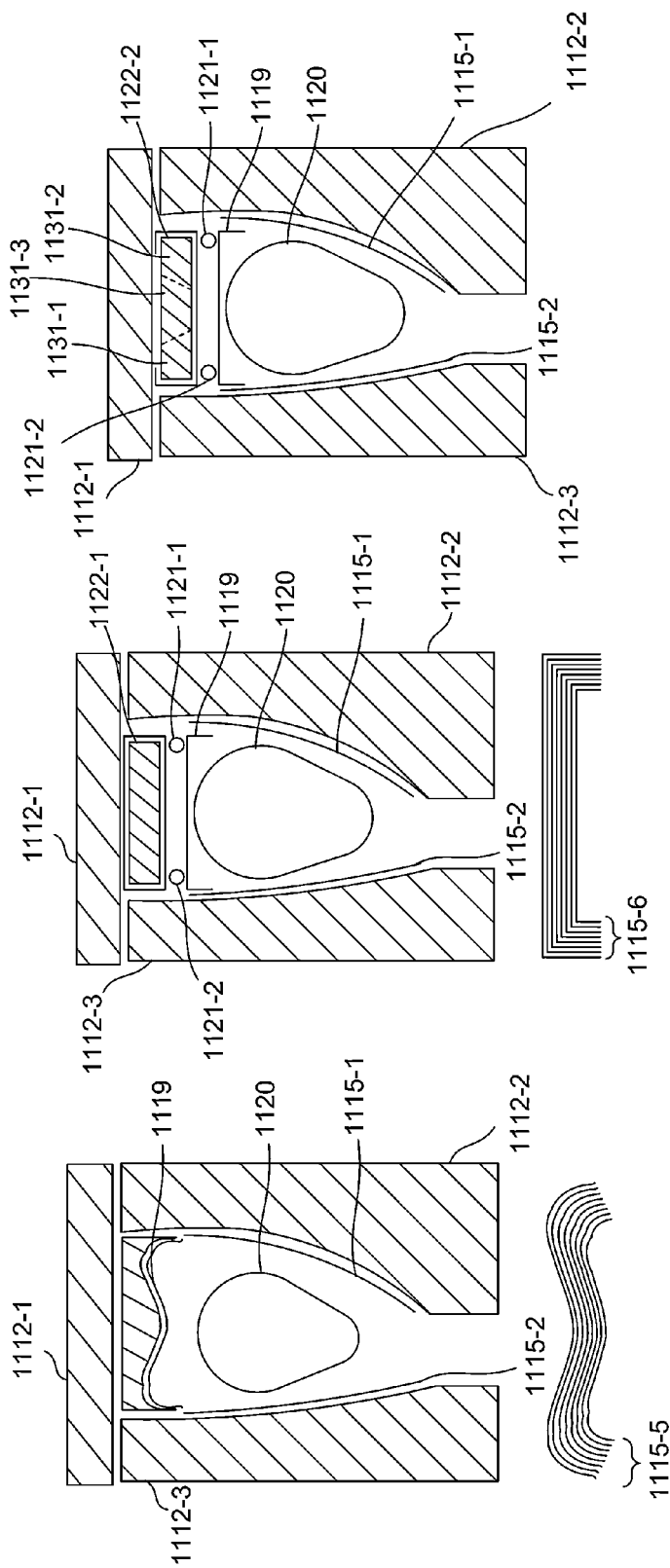

BICYCLE WHEELS WITH ASYMMETRIC CARBON FIBER RIMS

CROSS-REFERENCE TO RELATED APPLICATION

This application claims the benefit of U.S. Provisional Application No. 61/856,239, filed Jul. 19, 2013 and to U.S. Provisional Application No. 61/805,593, filed Mar. 27, 2013. These applications are herein incorporated by reference in their entireties.

BACKGROUND

Bicycle wheel rims are structural elements that retain a bicycle tire in place, provide braking surfaces, and provide attachment points for spokes. The wheel rims are subject to a variety of forces, including forces that are generated during acceleration, turning, braking, impacts as the tire passes over variations in the terrain, forces exerted on the rim by the spokes and inflated tire, and other forces. In addition to considering these forces in designing a wheel rim, for high performance applications, such as sprinting or bicycle racing, the mass, aerodynamics, and rotational inertia the bicycle rim are also significant design considerations.

Additionally, the number of gears on bicycles continues to increase. To accommodate an increasing number of gears, bicycle wheels may be asymmetric (dished). In an asymmetric rim, the spokes that connect the bicycle rim to the hub may have differences in length and tension. The asymmetry of the spokes and the differences in spoke forces directly influences the rim performance and can lead to increased maintenance and reliability challenges.

BRIEF DESCRIPTION OF THE DRAWINGS

The accompanying drawings illustrate various examples of the principles described herein and are a part of the specification. The illustrated examples are merely examples and do not limit the scope of the claims.

FIG. 3 is a chart showing variations in sidewall thicknesses for a range of rim cross sectional heights and offset distances, according to one example of principles described herein.

FIGS. 11A-11C show various lay-ups and mold components for forming an asymmetric carbon fiber rim, according to one example of principles described herein.

Throughout the drawings, identical reference numbers designate similar, but not necessarily identical, elements.

DETAILED DESCRIPTION

Figure 1:
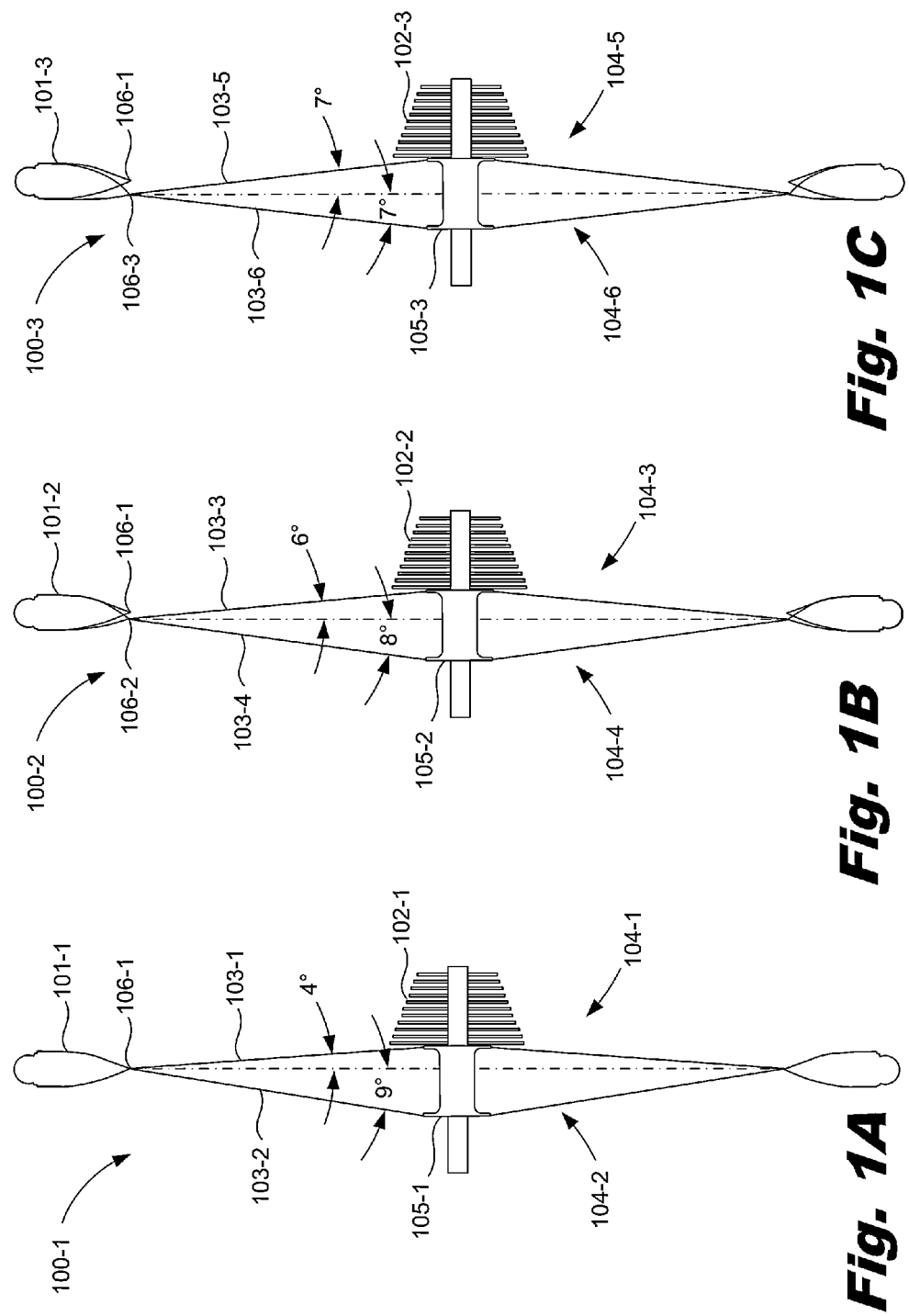
FIG. 1A shows a cross section of a dished bicycle wheel with a symmetric rim, according to one example of principles described herein.
FIG. 1B shows a cross section of a bicycle wheel with a partially asymmetric rim, according to one example of principles described herein.
FIG. 1C shows a cross section of a bicycle wheel with a fully asymmetric rim and symmetric spokes, according to one example of principles described herein.

As discussed above, the number of gears on bicycles continues to increase. To accommodate this increasing number of gears, a bicycle wheel may be asymmetric (dished). In an asymmetric wheel, the spokes that connect the bicycle rim to the hub may have differences in length and tension. These differences in length and tension may lead to increased maintenance and reliability challenges.

For example, composite rims that do not attempt to achieve minimum mass and maximum strength may be constructed without regard to optimizing the sidewall laminate thickness. If a manufacturer is primarily focused on the robustness of a rim, the manufacturer may make the side walls very thick or make the rim out of solid material.

In some cases, bicycle rim manufacturers may vary the wall thickness of a region of the rim based upon the function of the specific region. For example, the region where tensioned spokes attach may be thicker than the region known as the sidewall. In these cases, the sidewalls of the rim invariably mirror each other. Even where the cross section of the rim is asymmetric, the thicknesses of the sidewalls mirror each other. Although the left side and right side of the rim contours are different for rims of 30 mm or less, the wall section thicknesses are similar (identical within manufacturing tolerances).

Accordingly, the principles described below provide for different thickness of the two opposing sidewalls. In some examples, the asymmetry of a rim section exceeding 30 mm may create some design issues that can be less important for rim section heights of 30 mm or less. For example, an asymmetrical rim section includes a median plane at the tire interface (a plane passing through the center of the tire) that is offset from the median plane of the spoke face. The offset may increase tension as the spokes may attempt to align the median plane of the spoke face with the median plane of the tire interface. This adverse tension increases as spoke tension increases. This adverse tension may lead to additional stresses on the wheel. To reduce this adverse tension, the present disclosure describes a flat side of the rim that is stronger than the other sidewall. This is achieved by adding additional material (increasing material thickness) to the sidewall so that it is thicker than the more curved sidewall.

Additionally, a stressed wheel system that includes an asymmetric rim will exhibit the tendency to transfer the load (dynamic and static) in greater proportion through the straight side of the rim, as opposed the curved side of the rim. Because the load path of the straight sidewall is shorter and more direct, a greater proportion of the load will follow the straight path than the curved path. This tendency can result in over-stressing and ultimately failure of the flat side of the rim. Accordingly, the present disclosure addresses this potential failure mode by providing a straight sidewall that is stronger than a curved sidewall. This is achieved by adding additional material (increasing material thickness) to the sidewall so that it is thicker than the more curved sidewall.

While an asymmetrical rim with a section height exceeding 30 mm may have sidewalls equal in thickness, because of the differences in loads/forces that are transferred in the two sidewalls, this design cannot result in the lowest wheel weight. Accordingly, the present disclosure describes a flat sidewall that has a stronger and thicker cross-section than the curved sidewall.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

FIG. 1A shows a cross section of a dished bicycle wheel (100-1) with a symmetric rim (101-1). In this example, the wheel (100-1) is a rear wheel that includes a gear cassette (102-1) of eleven gears. In one example, a number of spokes (103-1) on a first side (104-1) of the wheel may extend from the hub (105-1) to the rim (101-1) at an angle of 4 degrees relative to a line perpendicular to the hub (105-1) as indicated in FIG. 1A. A number of spokes (103-2) on a second side (104-2) of the wheel (100-1) may extend from the hub (105-1) to the rim (101-1) at a 9 degree angle as indicated in FIG. 1A. To balance lateral forces on the rim (101-1), the tension on the spokes (103-1) on the first side (104-1) of the wheel (100-1) may be approximately 2.25 times greater than the tension on the spokes (103-2) on the second side (104-2) of the wheel (100-1). Additionally, the spokes (103-1) on the first side (104-1) of the wheel (100-1) may be shorter than the spokes (103-2) on the second side (104-2) of the wheel (100-1). The high tension in the spokes (103-1) on the first side (104-1) may result in reliability issues. Further, to repair the wheel (100-1), two different sizes of spokes may be needed.

FIG. 1B shows a cross section of a bicycle wheel (100-2) with a partially asymmetric rim (101-2). In this example, the wheel (100-2) is also a rear wheel that includes a gear cassette (102-2) with eleven gears. The rim (101-2) of the wheel (100-2) may be partially asymmetric, with the attachment point (106-2) of the spokes shifted when compared to the attachment point (106-1) of a symmetric rim (100-1). For example, the attachment point (106-2) of the spokes may be shifted to the left by 0.20 inches when compared to the attachment point (106-1) of a symmetric rim (100-1). The spokes (103-2) on a first side (104-3) of the wheel (100-2) may extend from the hub (105-2) to the rim (101-2) at a first angle. For example, as depicted in FIG. 1B, the spokes (103-2) on the first side (104-3) of the wheel (100-2) may extend from the hub (105-2) to the rim (101-2) at an angle of 6 degrees. The spokes (103-4) on a second side (104-4) of the wheel (100-2) may extend from the hub (105-2) to the rim (101-2) at a second angle. For example, as depicted in FIG. 1B, the spokes (103-4) on the second side (104-4) of the wheel (100-2) may extend from the hub (105-2) to the rim (101-2) at an angle of 8 degrees. To balance lateral forces on the rim (101-2), the tension on the spokes (103-3) on the first side (104-3) of the wheel (101-2) may be approximately 1.3 times greater than the spokes (104-4) on the second side (104-4) of the wheel (100-2).

FIG. 1C shows a cross section of a bicycle wheel (100-3) with a fully asymmetric rim (101-3). In this example, the wheel (100-3) is also a rear wheel that includes a gear cassette (102-3) with eleven gears. The rim (101-3) of the wheel (100-3) may be fully asymmetric, with the attachment point (106-3) of the spokes shifted when compared to the attachment point (106-1) of a symmetric rim (100-1). For example, the attachment point (106-3) of the spokes may be shifted to the left by 0.35 inches when compared to the attachment point (106-1) of a symmetric rim (100-1). This may allow the spokes (103-5) on a first side (104-5) and spokes (103-6) on a second side (104-6) to be symmetric with equal lengths and equal tensions. Equal spoke tension on the first side (104-5) and the second side (104-6) may result in a stronger, more stable and more balanced wheel (100-3). A fully asymmetric rim (101-3) may be a rim that allows the spokes (103) to have substantially equal lengths, attachment angles, and tensions. For example, as depicted in FIG. 1C, the spokes (103-5) on the first side (104-5) and the spokes (103-6) on the second side (104-6) may extend from the hub (105-3) to the rim (101-3) at an angle of approximately 7 degrees.

Figure 2:
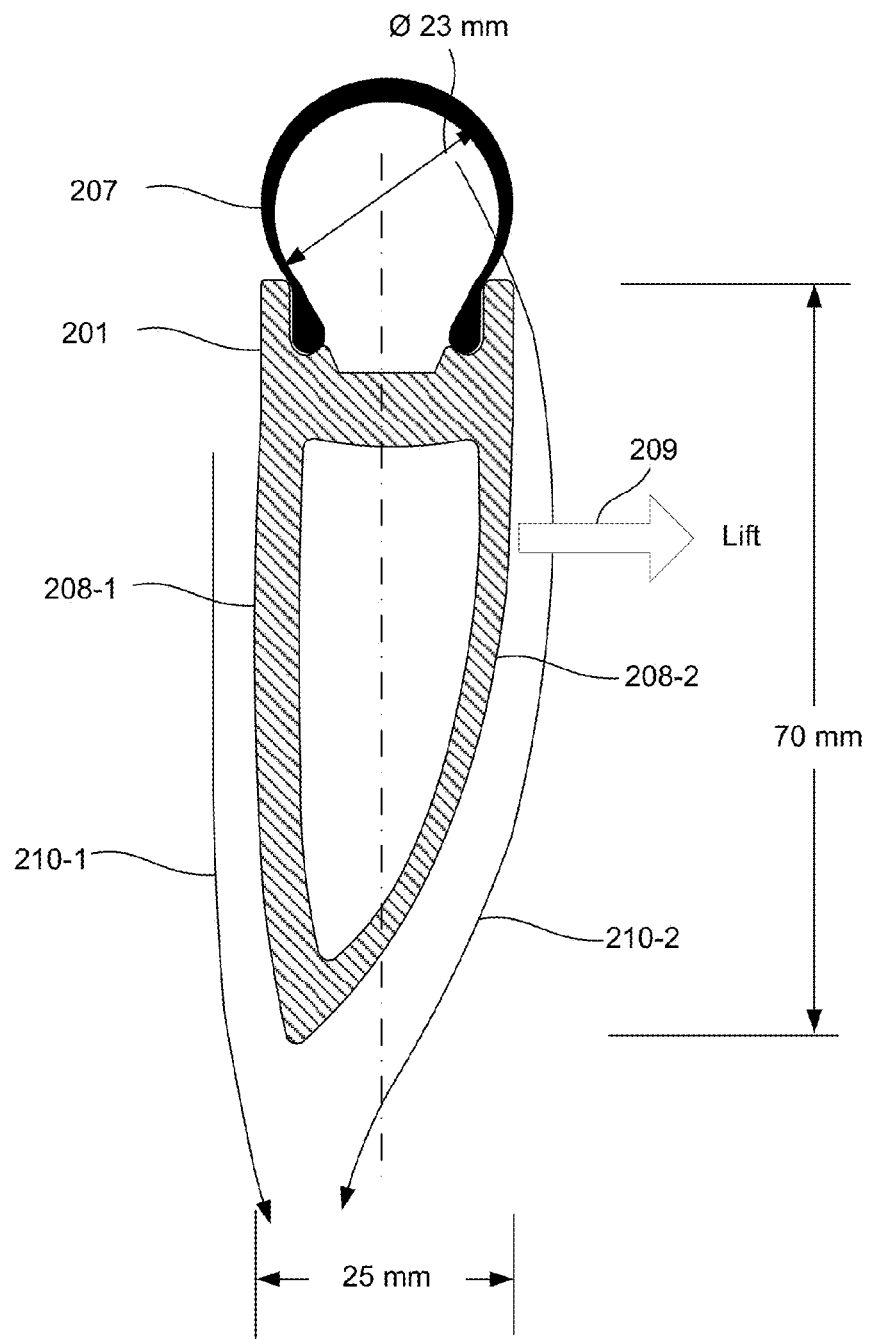
FIG. 2 is a cross section of a fully asymmetric carbon fiber rim and tire, according to one example of principles described herein.

FIG. 2 is a cross section of a fully asymmetric carbon fiber rim (201) and a tire (207). It should be noted that FIG. 2 is not to scale and the thicknesses of the various elements have been exaggerated for purposes of illustration. In some examples, the widest portion of the rim (201) may be approximately 25 millimeters and the height of the rim (201) may be approximately 70 millimeters. While FIG. 2 depicts specific dimensions of the rim (201), the rim (201) may include any dimensions. In some examples, the outer cross-sectional diameter of the tire (207) may be approximately 23 millimeters. In some examples, the rim (201) may be formed from carbon fiber.

As described above, the thickness of a more vertical straight sidewall (208-1) may be thicker than a curved sidewall (208-2) to better resist the forces applied to the rim (201) by the spokes (FIG. 1, 103). The lay-up of the carbon fibers may be altered to accommodate the asymmetric loading resulting from the offset connection of the spokes. Additionally, the asymmetrical shape of the rim (201) may produce a lift vector, as indicated by the arrow (209) in FIG. 2, when air (indicated by arrows 210-1 and 210-2) translates over the rim due to the forward bicycle velocity and environmental wind (if any). This directional lift (209) may propel the bicycle forward and may offset unusable directional lift generated from the bicycle frame offset due to chain rings, derailleur, crank and chain which are on the right side of the bicycle.

The drawings and descriptions given above are only examples. The principles described herein may be applied to a variety of bicycle wheel designs. For example, if a front wheel includes a disk brake, a front rim may be offset to accommodate the disk brake. Consequently, a front wheel may also benefit from including an asymmetric rim (201). Although the rim (201) illustrated is formed from carbon fiber, a variety of other materials could be used. For example, the principles described herein could be applied to aluminum rims and a variety of composite materials.

FIG. 3 is a chart (311) showing examples of variations in sidewall (FIG. 2, 208) thicknesses for a range of rim (FIG. 2, 201) heights and offset distances. In the first column, various rims (FIG. 2, 201) are listed with various rim (FIG. 2, 201) heights. For example, rim "A" may be a carbon fiber rim with a height of 90 millimeters (about 3.5 inches), rim "B" may be a rim with a height of approximately 72 millimeters (about 2.8 inches), rim "C" may be a rim with a height of approximately 58 millimeters (about 2.3 inches), and rim "D" may be a rim with a height of approximately 46 millimeters (about 1.8 inches). All dimensions in the chart (311) are in inches. The first row indicates variations in offset. A first offset ("0.3472 inch offset") may result in symmetric spoke geometries and equal tension in all the spokes (FIG. 1, 103). A second offset ("0.200 inch offset") may result in more equal spoke geometries but not totally symmetric spoke geometries or tensions. The offset may refer to the difference between an attachment point (FIG. 1, 106-2, 106-3) in a partially asymmetrical rim (FIG. 1, 101-2) and a fully asymmetrical rim (FIG. 1, 101-3) as compared to the attachment point (FIG. 1, 106-1) of a symmetrical rim (FIG. 1, 101-1).

The columns under the "0.3472 inch offset" heading show the sidewall (FIG. 2, 208) thicknesses for the various rims (FIG. 2, 201). The curved sidewall (FIG. 2, 208-2) in this example may have a uniform wall thickness of 0.017 inches. In this example, cured carbon fiber plies may have a thickness of between 0.0025 inches to 0.0055 inches. For example, a cured carbon fiber ply may have a thickness of 0.0049 inches. Consequently, in this example, the curved sidewalls (FIG. 2, 208-2) of the rims (FIG. 2, 201) include four carbon fiber plies. However, the straight sidewall (FIG. 2, 208-1) may have a greater thickness than the curved sidewall (FIG. 2, 208-2). This may allow the straight sidewall (FIG. 2, 208-1) to resist the higher forces applied to it by the spokes (FIG. 1, 103). For example, using rim "A" with a 0.3472 offset, the curved sidewall (FIG. 2, 208-2) may have a thickness of 0.017 inches while the straight sidewall (FIG. 2, 208-1) may have a thickness of between 0.0366-0.0415 inches (8-9 cured plies). Thus, rim "A" in this example may have 4 unidirectional carbon fiber plies that make up the curved sidewall (FIGS. 2, 208-1) and 8-9 plies that make up the straight sidewall (FIG. 2, 208-2).

In the chart (311) the difference in thickness between the curved sidewall (FIG. 2, 208-2) and straight sidewall (FIG. 2, 208-1) may be expressed as a ratio of the thickness of the straight sidewall (FIG. 2, 208-1) divided by the thickness of the curved sidewall (FIG. 2, 208-2). For example, rim "A" with a 0.3472 offset may have a wall thickness ratio of between 2.15 and 2.44. For the same offset, rim "B" may have a ratio of between 1.86 and 2.15, rim "C" may have a ratio of between 1.86 and 1.92, and the rim "D" may have a ratio of between 1.57 and 1.73. For the 0.2000 inch offset, the wall thickness ratio for rim "A" may be between 1.57 and 1.86. For the same offset, rim "B" and rim "C" may have a wall thickness ration between 1.29 and 1.58, and rim "D" may have a wall thickness ratio of between 1.29 and 1.41.

As indicated by the chart (311), as the height of the rim (FIG. 1, 101) gets larger, the straight sidewall (FIG. 2, 208-1) gets thicker in comparison to the thickness of the curved sidewall (FIG. 2, 208-2). This may be an unexpected result as the second moment of area of the element increases (i.e. as more material is farther away from a neutral axis) the stiffness of the structure element (rim) increases. Thus, although one might assume that a carbon fiber rim with a greater height could have thinner walls while maintaining the same stiffness as a shorter rim with thicker side walls, the present rim (FIG. 1, 101) describes the thickness of the straight sidewall (FIG. 2, 208-1) increasing as the height of the rim (FIG. 1, 101) increases. This prevents the higher rim (FIG. 1, 101) from bending or twisting under the applied loads. In effect, the straight sidewall (FIG. 2, 208-1) provides a greater moment arm for the off axis forces applied by the spokes (FIG. 1, 103). Consequently, the straight sidewall (FIG. 2, 208-1) may be thicker to resist the greater moment.

The chart (311) shows the thicknesses and number of plies in the sidewalls (FIG. 2, 208) for the various different rims and different offsets. These dimensions and number of plies are only examples. A variety of dimensions could be used depending on the specific design criteria and application.

FIGS. 4A-4B, 5A-5B, 6A-6B and 7A-7B show pairs of symmetrical rims and asymmetrical rims wherein the symmetrical rims have the same wall thickness on the left and right sidewalls and the asymmetrical rims have different wall thickness on the left and right sidewalls. The asymmetrical rims depicted in FIGS. 4B, 5B, 6B, and 7B may roughly correspond to the 0.3472 offset rims and dimensions indicated in FIG. 3. In this example, the rims are clincher rims with lips designed to retain tire beads. However, the rims could be any of a number of different types, including the tubular type shown in FIG. 2 or the bead seat clincher design shown in FIG. 13. All dimensions in these figures are in inches.

Figure 4A:
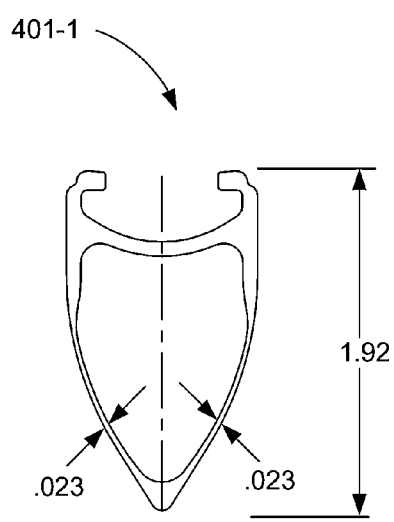
FIGS. 4A and 4B show, respectively, a symmetrical rim that has the same wall thicknesses and an asymmetrical rim that has different wall thicknesses, according to one example of principles described herein.
Figure 4B:
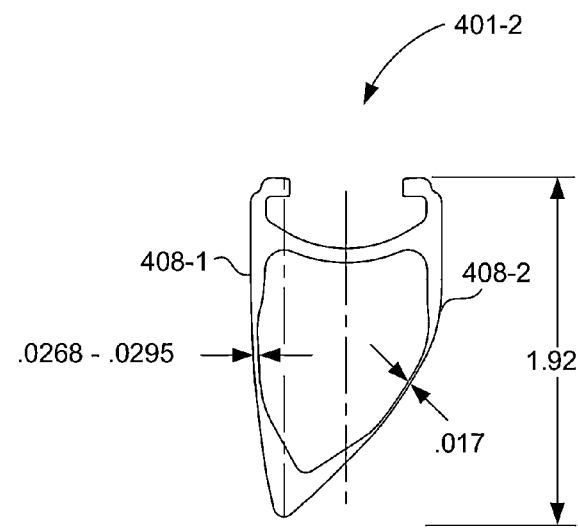

FIGS. 4A and 4B show examples of rim "D" that may have the same nominal height of 1.92 inches, but the rim shown in FIG. 4A is a symmetrical rim (401-1) that may have the same wall thicknesses (0.023 inches) on both sidewalls. By comparison, the rim shown in FIG. 4B may be an asymmetrical rim (401-2) that may have different wall thicknesses. More specifically, the straight sidewall (408-1) of the asymmetric rim (401-2) may have a thickness of between 0.0268 to 0.0295 inches while the curved sidewall (408-2) may have a thickness of 0.017 inches. As discussed above, the lateral offset of 0.3472 inches (for this example) may provide for uniform spoke (FIG. 1, 103) length, attachment angle, and tension.

Figure 5A:
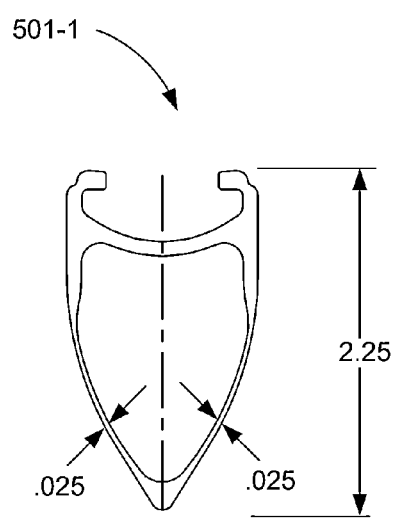
FIGS. 5A-5B show, respectively, a symmetrical rim that has the same wall thicknesses and an asymmetrical rim that has different wall thicknesses, according to one example of principles described herein.
Figure 5B:
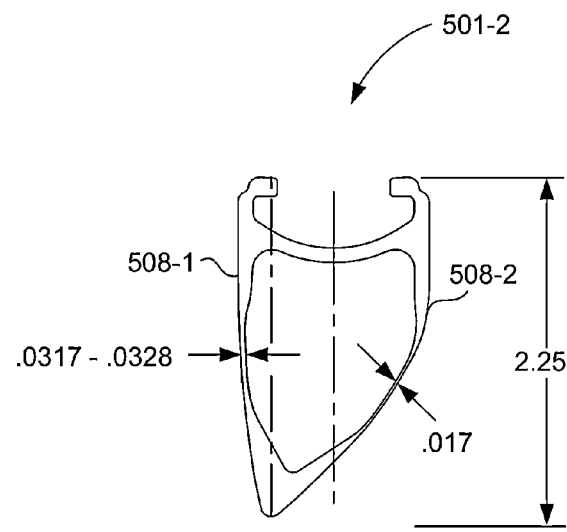

FIGS. 5A and 5B show examples of rim "C" that may have the same nominal height of 2.25 inches, but the rim shown in FIG. 5A is a symmetrical rim (501-1) that may have the same wall thicknesses (0.025 inches) on both sidewalls. By comparison, the rim shown in FIG. 5B may be an asymmetrical rim (501-2) that may have different wall thicknesses. More specifically, the straight sidewall (508-1) of the asymmetric rim (501-2) may have a thickness of between 0.0317 to 0.0328 inches while the curved sidewall (508-2) may have a thickness of 0.017 inches.

Figure 6A:
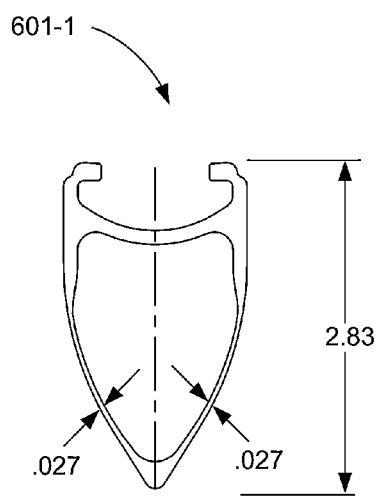
FIGS. 6A-6B show, respectively, a symmetrical rim that has the same wall thicknesses and an asymmetrical rim that has different wall thicknesses, according to one example of principles described herein.
Figure 6B:
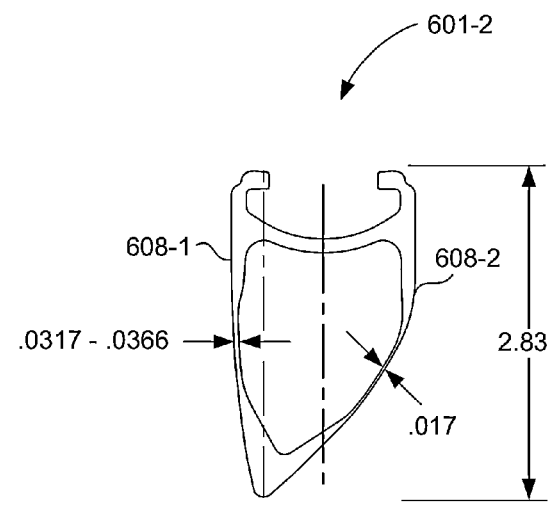

FIGS. 6A and 6B show examples of rim "B" that may have the same nominal height of 2.83 inches, but the rim shown in FIG. 6A is a symmetrical rim (601-1) that may have the same wall thicknesses (0.027 inches) on both sidewalls. By comparison, the rim shown in FIG. 6B may be an asymmetrical rim (601-2) that may have different wall thicknesses. More specifically, the straight sidewall (608-1) of the asymmetric rim (601-2) may have a thickness of between 0.0317 to 0.0366 inches while the curved sidewall (608-2) may have a thickness of 0.017 inches.

Figure 7A:
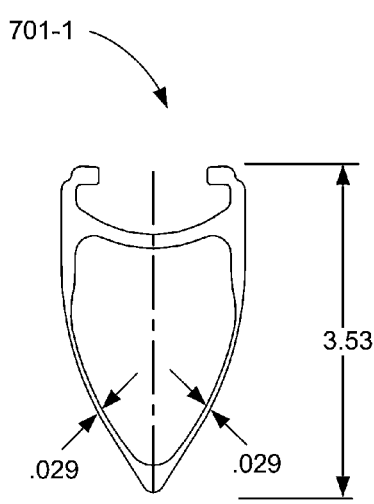
FIGS. 7A-7B show, respectively, a symmetrical rim that has the same wall thicknesses and an asymmetrical rim that has different wall thicknesses, according to one example of principles described herein.
Figure 7B:
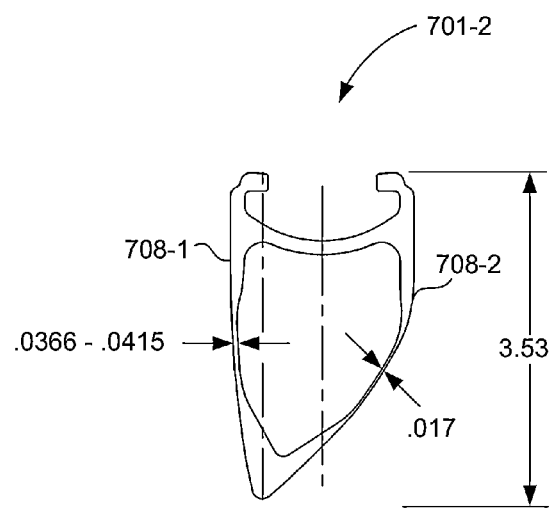

FIGS. 7A and 7B show examples of rim "A" that may have the same nominal height of 3.53 inches, but the rim shown in FIG. 7A is a symmetrical rim (701-1) that may have the same wall thicknesses (0.029 inches) on both sidewalls. By comparison, the rim shown in FIG. 7B may be an asymmetrical rim (701-2) that may have different wall thicknesses. More specifically, the straight sidewall (708-1) of the asymmetric rim (701-2) may have a thickness of between 0.0366 to 0.0415 inches while the curved sidewall (708-2) may have a thickness of 0.017 inches.

Figure 8C:
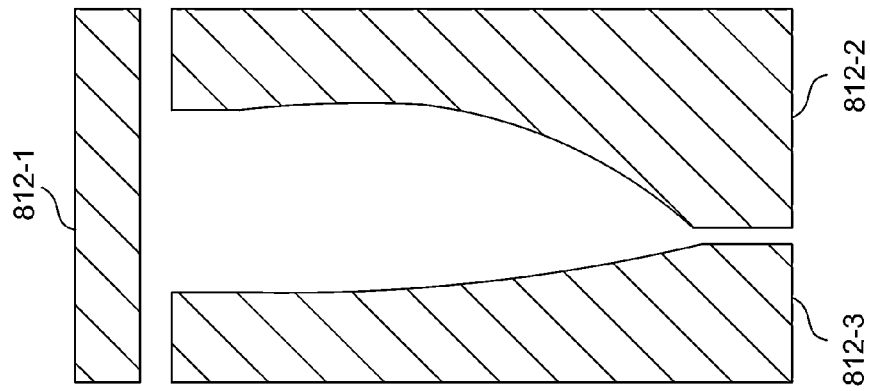
FIGS. 8A-8C are diagrams of a mold for forming an asymmetric carbon fiber rim, according to one example of principles described herein.
Figure 8B:
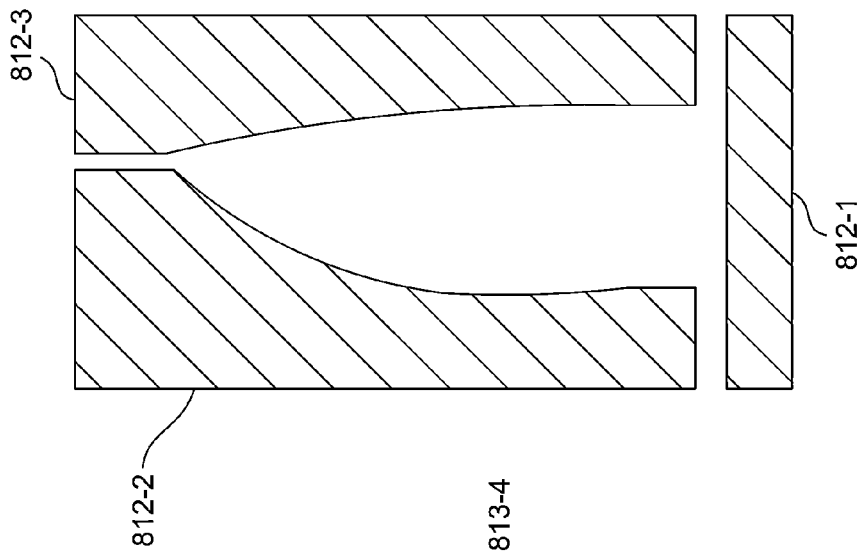
Figure 8A:
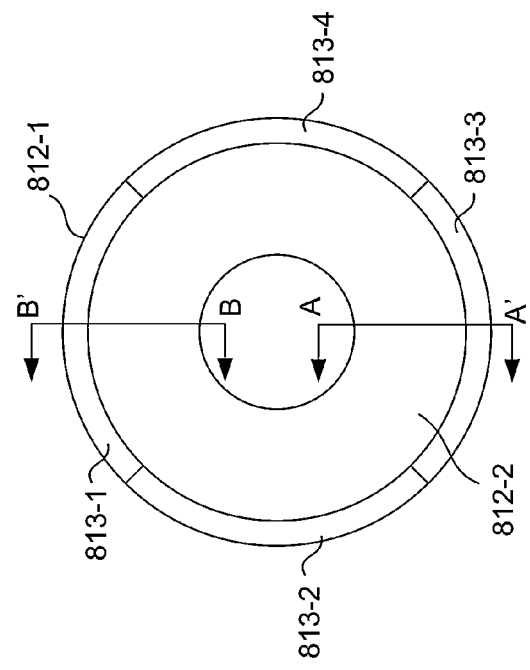

FIGS. 8A, 8B, and 8C are diagrams of a mold for forming an asymmetric carbon fiber rim (FIG. 1, 101-3). FIG. 8A is a side view of the mold. The mold may include three portions, a top mold (812-1) divided into four segments (813-1, 813-2, 813-3, 813-4) to form an outer perimeter of the rim (FIG. 1, 101-3), a first ring mold (812-2) to form the curved sidewall (FIG. 2, 208-2), and a second ring mold (812-3) to form the straight sidewall (FIG. 2, 208-1). In FIG. 8A, the second ring mold (812-3) is not shown and is on the opposite side of the first ring mold (812-2).

Two cross sections are taken through the mold. Cross section A-A' shown in FIG. 8B and cross section B-B' shown in FIG. 8C. In this example, the portion of the mold that forms the rim (FIG. 1, 101-3) may include three parts: a first ring mold (812-2) that forms the curved sidewall (FIG. 2, 208-2) of the rim (FIG. 1, 101-3), a second ring mold (812-3) that forms the straight sidewall (FIG. 2, 208-1) of the rim (FIG. 1, 101-3), and a top mold (812-1) that is divided into four segments (813-1, 813-2, 813-3, 813-4) that cover the top (outer perimeter) of the rim (FIG. 1, 101-3).

Figure 9:
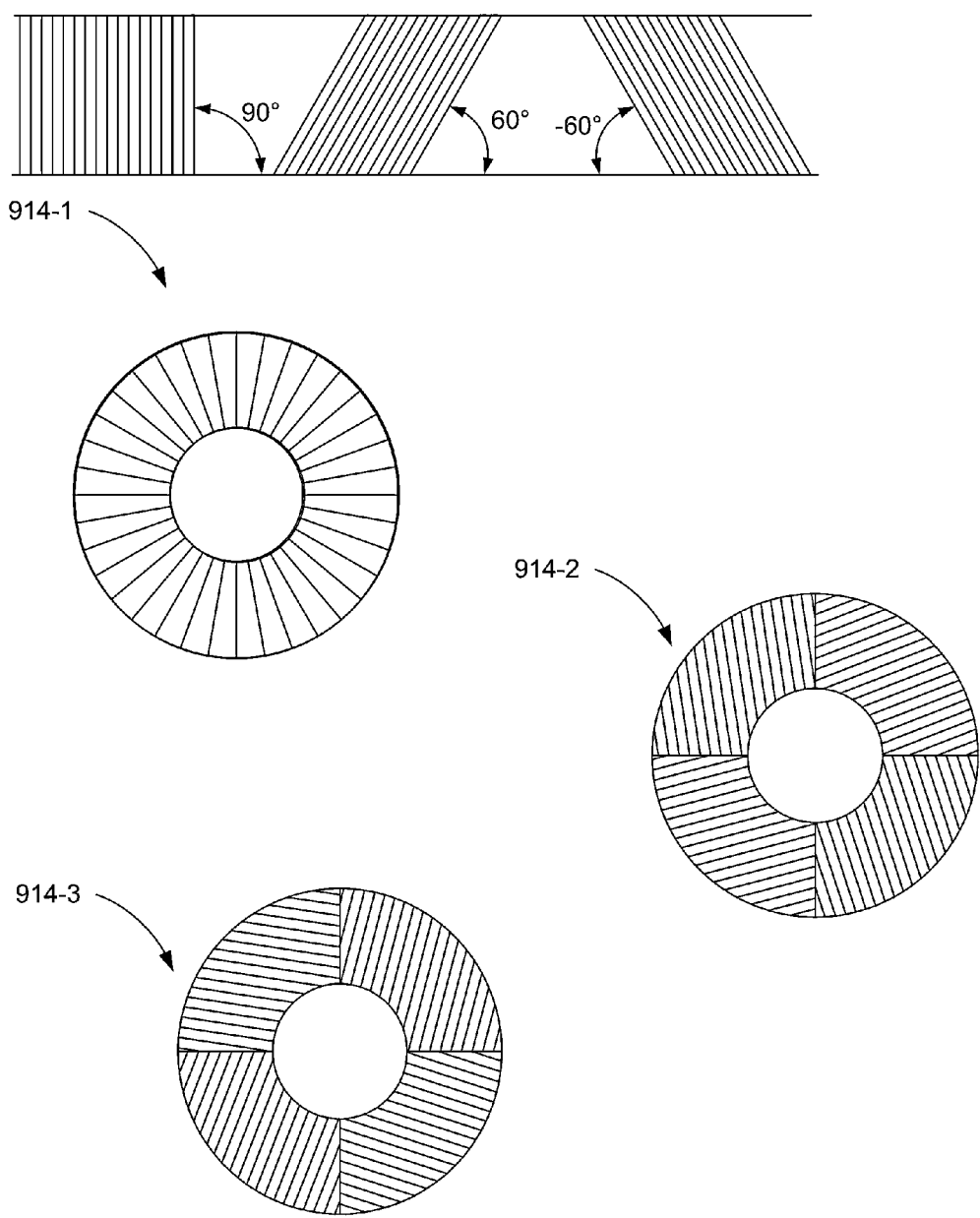
FIG. 9 describes various ply lay-up angles for forming an asymmetric carbon fiber rim, according to one example of principles described herein.

FIG. 9 illustrates various carbon fiber ply lay-up angles. For example, the carbon fibers may be laid-up perpendicular to a surface, positive 60 degrees relative to a surface and negative 60 degrees relative to a surface. FIG. 9 also depicts a 90 degree lay-up (914-1), a positive 60 degree lay-up (914-2), and a negative 60 degree lay-up (914-3) in the context of rim (FIG. 1, 101) construction.

FIGS. 10A-C, 11A-C, and 12A-B illustrate various aspects in the construction of an asymmetric carbon rim (FIG. 1, 101-3). First an inflatable component may be used to form the rim (FIG. 1, 101-3). The inflatable component may be a flexible and continuous tube material such as nylon, silicone, latex. The inflatable component may serve as a containment vessel and a non-permeable layer to hold high-pressure gas/air. A channel mandrel may serve as a core that will be removed in a post-molding process. The channel mandrel may be fabricated from: metal, wood, Teflon, silicone, plastic (HDPE) or other ridged, semi-ridged, or flexible core material.

According to the present disclosure, carbon ply thickness may range from 0.003" to 0.005". However, carbon plies that are thicker or thinner may also be used. All material referenced in this disclosure is carbon-fiber pre-preg. Other composite material can be used and the process may be adjusted to support those materials. Carbon pre-preg may have a number of advantages including high-strength, low-mass, material availability, molding ability, and performance.

Figure 10A:
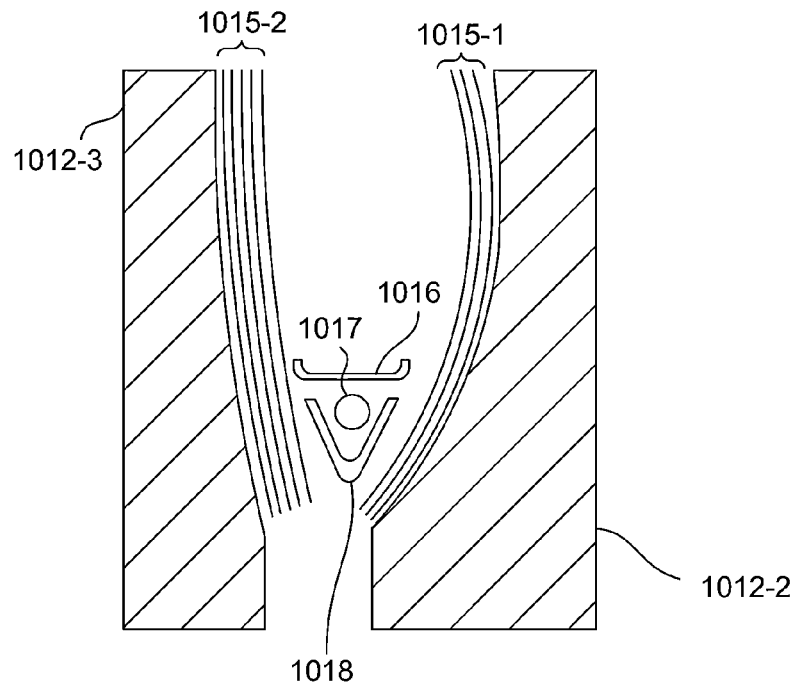
FIGS. 10A-10C show cross sectional diagrams of carbon fiber plies at an inner diameter of an asymmetric carbon fiber rim, according to one example of principles described herein.
Figure 10B:
Figure 10C:
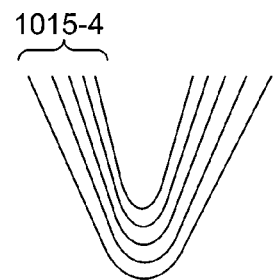

FIGS. 10A-10C show cross sectional diagrams of carbon fiber plies (1015) at the inner diameter of an asymmetric carbon fiber rim (FIG. 1, 101-3). The first ring mold (1012-2) and the second ring mold (1012-3) may have various plies. For example, the first ring mold may have a set of curved sidewall plies (1015-1) that may include three plies. These plies may have an asymmetric lay-up. For example, the curved sidewall plies (1015-1) may include, from the inside going out, a negative 60 degree ply, a positive 60 degree ply, and a 90 degree ply. Similarly, the second ring mold (1012-3) may have a set of straight sidewall plies (1015-2) that may include five plies. These plies may have a symmetric lay-up. For example, the straight sidewall plies (1015-2) may include, from the inside going out, a negative 60 degree ply, a positive 60 degree ply, a 90 degree ply, a positive 60 degree ply, and a negative 60 degree ply. In other words the straight sidewall plies (1015-2) may be symmetrical about the center ply.

A number of components may be inserted into the tip of the rim (FIG. 1, 101) where the curved sidewall plies (1015-1) and the straight sidewall plies (1015-2) meet. These elements may include a Tow Cover (TC) (1016), a Lower Tow Wrap (LTW) (1017) and Lower Connecting Plies (LCP) (1018). These elements may be used to join the curved sidewall plies (1015-1) and the straight sidewall plies (1015-2) and may add structure to the bottom portion of the rim (FIG. 1, 101) where the spokes (FIG. 1, 103) will attach.

FIG. 10B illustrates more detail for the tow cover plies (1015-3) of the tow cover (1016). More specifically, the tow cover (1016) may include a symmetric ply lay-up. For example, the tow cover plies (1015-3) may include, from the inside going out, a negative 60 degree ply, a positive 60 degree ply, a 90 degree ply, a positive 60 degree ply, and a negative 60 degree ply.

FIG. 10C illustrates more detail for the lower connecting plies (1015-4) of the lower connecting ply layer (1018). More specifically, the lower connecting ply layer (1018) may include a symmetric ply lay-up. For example, the lower connecting plies (1015-4) may include, from the inside going out, a negative 60 degree ply, a positive 60 degree ply, a 90 degree ply, a positive 60 degree ply, and a negative 60 degree ply.

FIGS. 11A-11C illustrate different elements in the upper portion of the mold. Each of the figures show different configurations. FIG. 11A shows molds (1112-1, 1112-2, 1112-3) for an asymmetric rim (FIG. 1, 101-3) that is configured to have an inflated tire adhered to its upper surface (a "tubular" wheel). As demonstrated above, curved sidewall plies (1115-1) may be pressed against a first ring mold (1112-2). Similarly, straight sidewall plies (1115-2) may be pressed against the second ring mold (1112-3). In FIGS. 11A-C, for simplicity, these plies, and other carbon fiber plies are represented by a single line. For example, the three plies of the curved sidewall plies (1115-1) may be represented by a single line.

In this example, an upper surface of the rim (FIG. 1, 101-3) may be formed with an upper connecting ply layer (1119) that may include a number of upper connecting plies (1115-5) that may include 9 carbon fiber plies. The 9 carbon fiber plies may include, from the inside going out, a 90 degree ply, a 90 degree ply, a negative 60 degree ply, a positive 60 degree ply, a 90 degree ply, a positive 60 degree ply, a negative 60 degree ply, a 90 degree ply, and another 90 degree ply. During the molding process, an inflatable component (1120) may be inflated to press the carbon layers together and against the mold.

FIG. 11B shows a mold that includes an upper connecting ply layer (1119), a number of tow wraps (1121), and a one-piece flexible or semi-flexible channel mandrel (1122-1). A number of channel plies may be wrapped around the channel mandrel (1122) as will be described below in FIGS. 12A-B. In this example, the inflatable component (1120) may be in the center of the molds and may be inflated during the molding process. The mold shown in FIG. 11B may also include a first tow wrap (1121-1) and a second tow wrap (1121-2) on either side of the upper connecting ply layer (1119).

In this example, an upper surface of the rim (FIG. 1, 101-3) may be formed with an upper connecting ply layer (1119) that may include a number of upper connecting plies (1115-6) that may include 9 carbon fiber plies. The 9 carbon fiber plies may include, from the inside going out, a 90 degree ply, a 90 degree ply, a negative 60 degree ply, a positive 60 degree ply, a 90 degree ply, a positive 60 degree ply, a negative 60 degree ply, a 90 degree ply, and another 90 degree ply. During the molding process, an inflatable component (1120) may be inflated to press the carbon layers together and against the mold.

FIG. 11C shows a mold that may include a three-piece channel mandrel (1122-2) that may allow for the formation of bead hooks to retain a tire bead. The three-piece channel mandrel (1122-2) may be made out of metal. The three-piece channel mandrel (1122-2) may include three pieces, a left piece (1131-1), a right piece (1131-2) and a center piece (1131-3) that may be configured such that they may be extracted after the molding process. Each piece (1131) of the three-piece channel mandrel (1122-2) is indicated by a dashed line. In some examples, the upper connecting ply layer (1119) depicted in FIG. 11C may be the same lay-up as demonstrated above in connection with FIG. 11B.

Figure 12A:
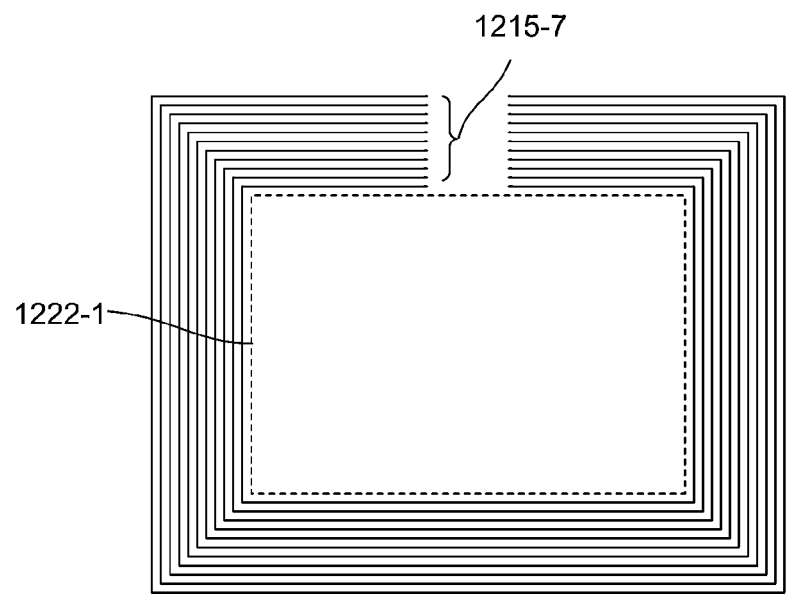
FIGS. 12A and 12B show cross sectional diagrams of various channel plies for forming an asymmetric carbon fiber rim, according to one example of principles described herein.
Figure 12B:
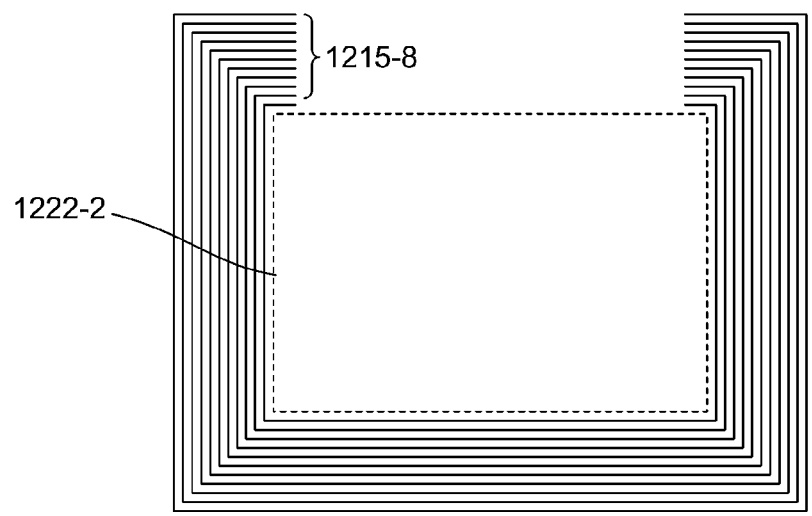

FIGS. 12A and 12B show the lay-ups for the various channel plies (1215-7, 1215-8) formed around the channel mandrels (1222-1, 1222-2). More specifically, FIG. 12A illustrates a first number of channel plies (1215-7) that may be wrapped around the one-piece channel mandrel (1222-1). In this example, the first number of channel plies (1215-7) may include 11 carbon fiber plies. The 11 carbon fiber layers may include, from the inside going out, a 90 degree ply, a 90 degree ply, a negative 60 degree ply, a positive 60 degree ply, a 90 degree ply, a 90 degree ply, a 90 degree ply, a positive 60 degree ply, a negative 60 degree ply, a 90 degree ply, and another 90 degree ply.

FIG. 12B illustrates a second number of channel plies (1215-8) that may be wrapped around the three-piece channel mandrel (1222-2). In this example, the second number of channel plies (1215-8) may include 11 carbon fiber plies. The 11 carbon fiber layers may include, from the inside going out, a 90 degree ply, a 90 degree ply, a negative 60 degree ply, a positive 60 degree ply, a 90 degree ply, a 90 degree ply, a 90 degree ply, a positive 60 degree ply, a negative 70 degree ply, a 90 degree ply, and another 90 degree ply.

Figure 13:
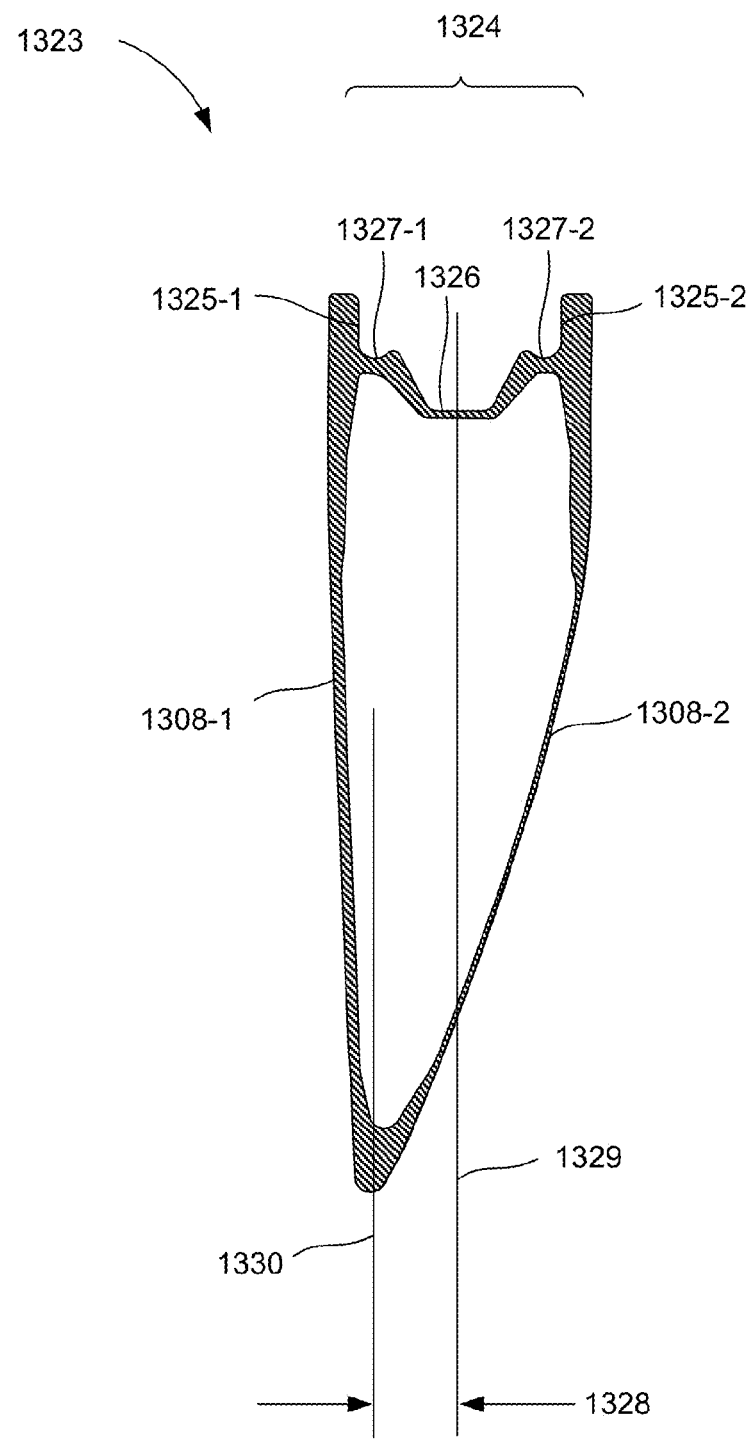
FIG. 13 is a cross sectional diagram of an illustrative bead seat clincher rim, according to one example of principles described herein.

FIG. 13 is a cross-sectional diagram of an illustrative asymmetric bead seat clincher rim (1323). Bead hooks are protrusions from the sidewalls (1308-1, 1308-2) of the rim (1323) that capture the bead of the tire and retain the tire on the rim (1323) as long as the tire is inflated and thus under pressure. However, as indicated above with respect to FIG. 11C, the molds to form the bead hooks may be more complex and the bead hooks may be subjected to additional forces that must be withstood by the rim (1323). FIG. 13 shows an asymmetric bead seat clincher rim (1323) that includes a tire supporting surface (1324) bounded by a first vertical wall (1325-1) and a second vertical wall (1325-2). The tire supporting surface (1324) may also include a central indentation (1326) having ascending slopes on either side, elevated retention features, and cups (1327-1, 1327-2) adjacent to the retention features, in which the elevated retention features are interposed between the ascending slopes and the cups. When a tire is inflated on the rim (1323), the beads of the tire are supported by the cups (1327-1. 1327-2) and the vertical sidewalls (1325-1, 1325-2) of the tire supporting surface (1324). This design may be free of the issues caused by bead hooks. For example, no cantilever forces affect the design, performance, or life expectancy of the rim. Moreover, the rim (1323) is easier to manufacture without any negative sloping surfaces as are needed for forming bead hooks.

The asymmetric bead seat clincher rim (1323) may include an offset (1328) between the median plane (1330) of the spoke face and the median plane (1329) of the tire. The median plane (1329) of the tire may be defined by its attachment to the rim (1323). In this case, the median plane of an inflated tire (1329) may be defined by the cups (1327-1, 132702) that receive the beads of the tire and the vertical walls (1325-1, 1325-2) of the tire supporting surface (1324) that constrain the tire.

Figure 14:
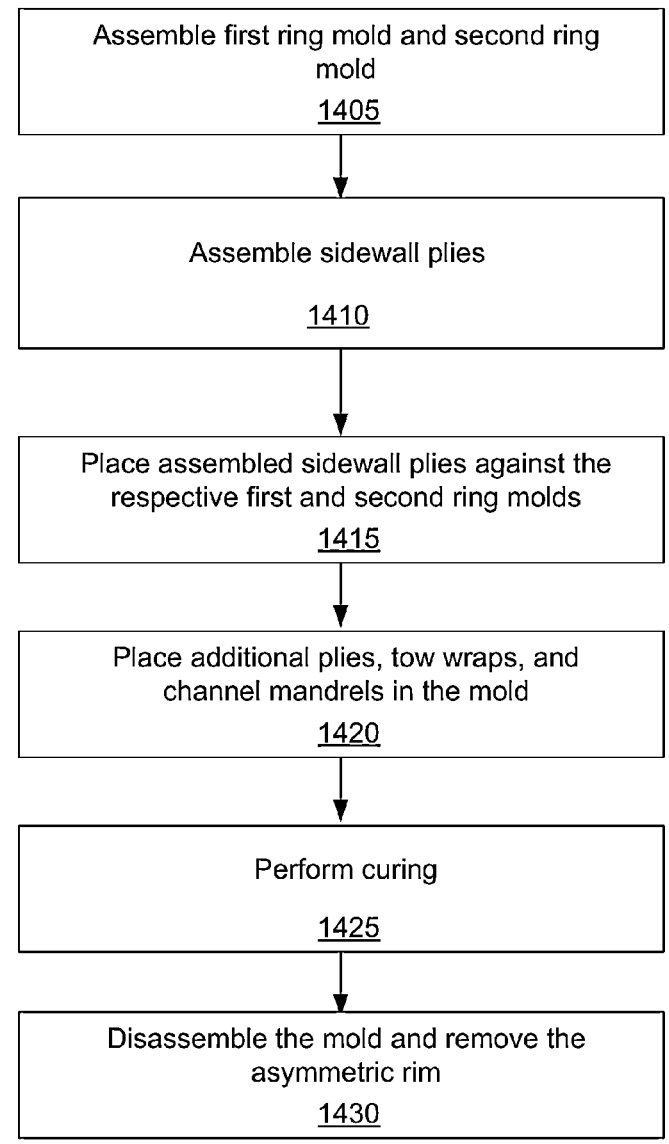
FIG. 14 is a flow chart of a method for forming an asymmetric carbon fiber rim, according to one example of principles described herein.

FIG. 14 is a flow chart of a method (1400) for forming an asymmetric carbon fiber rim (FIG. 1, 101-3). The first ring mold (FIG. 8, 812-2) and the second ring mold (FIG. 8, 812-3) may be assembled (block 1405). The ring molds (FIG. 8, 812-2, 812-3) may be connected via fasteners such as bolts or they may be held in intimate contact via a press or clamp. The fasteners for holding the ring molds (FIG. 8, 812-2, 812-3) together may be reversible. For example, the bolts or clamps may be removed so that the ring molds (FIG. 8, 812-2, 812-3) may be separated after the part is cured.

A number of sidewall plies (1015-1, 1015-2) may be assembled (block 1410) by stacking them sequentially and pressing them together (e.g. pressing them together by the force of a hand). Other methods such as a roller or warm iron may be used for a more intimate ply composition. The sidewall plies (FIG. 10, 1015-1, 1015-2) may be assembled according to the ply key depicted in FIG. 9 and according to the lay-up shown in FIG. 10A. For example, the curved sidewall plies (FIG. 10, 1015-1) may be laid up in a 90 deg./+60 deg./−60 deg. orientation. Similarly, the straight sidewall plies (FIG. 10, 1015-2) may be laid up in a −60 deg./+60 deg./90 deg./+60 deg./−60 deg. orientation.

The assembled sidewall plies (FIG. 10, 1015-1, 1015-2) may be placed (block 1415). For example, the curved sidewall plies (FIG. 10, 1015-1) may be placed against the first ring mold (FIG. 8, 812-2) with the 90 deg. ply against the first ring mold (FIG. 8, 812-2) surface. Similarly, the straight sidewall plies (FIG. 10, 1015-2) may be placed against the second ring mold (FIG. 8, 812-3) with the 90 deg. ply against the second ring mold (FIG. 8, 812-3) surface.

Additional plies (FIG. 10, 1015), tow wraps (FIG. 11, 1121), and channel mandrels (FIG. 11, 1122) may be placed (block 1420) in the mold. For example, the lower connecting plies (FIG. 10, 1015-4 may be laid up in a −60 deg./+60 deg./90 deg./+60 deg./−60 deg. configuration and inserted into the mold over the abutting edges of the curved sidewall plies (FIG. 10, 1015-1) and the straight sidewall plies (FIG. 10, 1015-2). The lower tow wrap (FIG. 10, 1017) may be placed over the lower connecting plies (FIG. 10, 1015-4). The lower tow wrap (FIG. 10, 1017) may have a variety of configurations including a twisted or straight stand of unidirectional carbon fibers. For example, the fibers in the lower tow wrap (FIG. 10, 1017) may be made up of "tow preg" where the carbon fibers are twisted together to form a cord that is and placed as shown in FIG. 10A.

The tow cover plies (FIG. 10, 1015-3) may then be laid up in a −60 deg./+60 deg./90 deg./+60 deg./−60 deg. configuration and laid over the lower connecting plies (FIG. 10, 1015-4). The inflatable component (FIG. 11, 1120) may then be placed in the mold in a deflated state. The upper connecting plies (FIG. 11, 1115-5, 1115-6) may then be laid up in a 90 deg./90 deg./−60 deg./+60 deg./90 deg./+60 deg./−60 deg./90 deg./90 deg. configuration and placed as shown in FIG. 11A, 11B or 11C. For a tubular rim as shown in FIG. 11A, the assembly is then complete.

For alternative designs, such a clincher rim (FIG. 13, 1323), there may be a number of additional steps. For example, a first tow wrap (FIG. 11, 1121-1) and a second tow wrap (FIG. 11, 1121-2) may be placed over the upper connecting plies (FIG. 11, 1115-5, 1115-6). These tow wraps (FIG. 11, 1121) may have an annular configuration and circle the diameter of the rim (FIG. 1, 101). In one embodiment, approximately 15 grams of tow preg may be used for each wrap. The channel plies (FIG. 12, 1215-7, 1215-8) may then be laid up in a 90 deg./90 deg./−60 deg./+60 deg./90 deg./90 deg./90 deg./+60 deg./−60 deg./90 deg./90 deg. configuration and then put in place.

A channel mandrel (FIG. 11, 1122-1, 1122-2) may then be placed over the channel plies (FIG. 12, 1215-7, 1215-8) as shown in FIG. 12A or 12B. The first channel mandrel (FIG. 11, 1122-1) may be a flexible or semi-flexible that can be cut-out of the mold. The first channel mandrel (FIG. 11, 1122-1) may be removed post molding by cutting or mechanical routing of the closed carbon-fiber section. The second channel mandrel (FIG. 11, 1122-2) may be formed from multiple pieces of metal and can be removed by disassembling the components post molding. The second channel mandrel (FIG. 11, 1122-2) may be a 3 piece (in section) metal mandrel. During assembly, a first section (FIG. 1, 1131-1) of the mandrel is inserted and a first small carbon tab is folded over, a second section (FIG. 1, 1131-2) is then inserted and a second small carbon tab is folded over, a third section (FIG. 1, 1131-3) is then inserted forcing the first section (FIG. 1, 1131-1) and the second section (FIG. 1, 1131-2) into position. During de-molding (post cure), these steps are reversed.

The four segments (FIG. 8, 813-2, 813-2, 813-3, 813-4) of the top mold (FIG. 8, 812-1) may then be placed. These mold segments (FIG. 8, 813-2, 813-2, 813-3, 813-4) may be connected using bolts, clamps, or presses.

The curing process is then performed (block 1425). The curing process begins by starting to catalyze the resin system. For example, heat may be applied to the mold to cure the resin. In some examples, the heat may be applied with electrical heaters or using microwaves. The temperature of the cure and the time associated with the cure process may be unique to the pre-preg system. Typical curing temperatures may be between 150 degrees Celsius and 300 degrees Celsius.

After the heating process begins, the inflatable component (FIG. 11, 1120) may be pressurized using a high pressure gas by opening a high pressure gas valve. Pressure values may be between 100 psi (7 bar) and 500 psi (34 bar) in some examples.

When the curing of the resin is complete the mold will be disassembled (block 1430) and the asymmetric rim (FIG. 1, 101-3) may be removed. For a tubular rim, the high pressure gas pressure may be decreased to ambient pressure and the high pressure gas valve may be closed. The mold may be cooled to a temperature appropriate for handling purposes. The four segments (FIG. 8, 813-1, 813-2, 813-3, 813-4) may be removed and the ring molds (FIG. 8, 812-2, 812-3) may be separated and the cured rim may be removed.

For a clincher rim (FIG. 13, 1323), the process may involve additional steps. As discussed above, the high pressure gas pressure may be decreased to ambient pressure and the high pressure gas valve is closed. The mold may be cooled to a temperature appropriate for handling purposes and the four segments (FIG. 8, 813-1, 813-2, 813-3, 813-4) may be removed. The channel mandrel (FIG. 11, 1122-1, 1122-2) may be removed if the mandrel is metal (FIG. 11C). If the channel mandrel (FIG. 11, 1122-1, 1122-2) is flexible or semi-flexible, (FIG. 11B), the rim material may be cut or routed so that the channel mandrel may be removed. The ring molds (FIG. 8, 812-2, 812-3) may be separated and the cured rim may be removed. Attachment holes for the metal spokes may be drilled in the rim (FIG. 1, 101), the inflation stem inserted, the hub (FIG. 1, 105) attached, and the wheel trued.

The steps described above are only examples of methods to form asymmetric carbon fiber rims (FIG. 1, 101-3) for bicycles. The methods could be modified in a variety of ways, including combining steps, removing steps, adding steps or reordering the steps.

The principles taught above provide for fully or partially asymmetric rims with heights of greater than 30 millimeters. A fully asymmetric rim has a number of advantages including symmetric spoke angles and uniform spoke tension. The asymmetric rims have two side walls, with the straighter side wall being substantially thicker than the curved side wall.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A bicycle wheel comprising:
   a hub;
   an asymmetric carbon fiber rim comprising:
      a curved sidewall; and
      a straight sidewall, wherein the straight sidewall is thicker than the curved sidewall; and
   a number of symmetric left and right spokes connecting the hub to the rim.

2. The wheel of claim 1, wherein the rim comprises a cross-sectional height greater than 30 millimeters.

3. The wheel of claim 1, wherein a ratio of a thickness of the straight sidewall to a thickness of the curved sidewall is at least 1.4.

4. A bicycle wheel comprising:
   a hub;
   an asymmetric carbon fiber rim comprising:
      a curved sidewall; and
      a straight sidewall, wherein the straight sidewall is thicker than the curved sidewall; and
   a number of symmetric left and right spokes connecting the hub to the rim;
   wherein a ratio of a thickness of the straight sidewall to a thickness of the curved sidewall is at least 1.4 and
   wherein the thickness of the straight sidewall comprises a minimum thickness of the straight sidewall and wherein the thickness of the curved sidewall comprises a minimum thickness of the curved sidewall.

5. A bicycle wheel comprising:
   a hub;
   an asymmetric carbon fiber rim comprising:
      a curved sidewall; and
      a straight sidewall, wherein the straight sidewall is thicker than the curved sidewall; and
   a number of symmetric left and right spokes connecting the hub to the rim;
   wherein the straight sidewall comprises at least two more carbon fiber plies than the curved sidewall.

6. The wheel of claim 1, wherein the left spokes and right spokes extend between the hub and rim at a same angle.

7. The wheel of claim 1, wherein the spokes are tensioned spokes.

8. The wheel of claim 7, wherein the left spokes and right spokes are set at substantially the same tension.

9. The wheel of claim 1, wherein the left spokes and right spokes are adjustable tension steel spokes.

10. The wheel of claim 1, wherein the rim is a bead seat clincher rim.

11. A bicycle wheel comprising:
a hub;
an asymmetric carbon fiber rim comprising:
 a curved sidewall; and
 a straight sidewall, wherein the straight sidewall is thicker than the curved sidewall; and
a number of symmetric left and right spokes connecting the hub to the rim;
wherein the rim comprises a tire supporting surface bounded by a first vertical sidewall and a second vertical sidewall.

12. The wheel of claim 11, wherein:
the rim comprises a cup bounded by an elevated feature and the first vertical sidewall;
the cup comprises a localized depression; and
the cup receives a bead from a tire when the tire is inflated.

13. The wheel of claim 1, wherein the rim is a tubular rim.

14. The wheel of claim 1, wherein the rim has a cross-sectional height of at least 70 millimeters.

15. A bicycle wheel comprising:
a hub;
an asymmetric carbon fiber rim having a cross-sectional height greater than 30 millimeters, the rim comprising:
 a curved sidewall; and
 a straight sidewall, wherein:
  the straight sidewall is thicker than the curved sidewall by a ratio of at least 1.4; and
  the straight sidewall comprises at least two more carbon plies than the curved sidewall; and
symmetric left spokes and right spokes connecting the hub to the rim, wherein the left spokes and right spokes comprise adjustably tensioned spokes.

16. The wheel of claim 15, wherein the left spokes and the right spokes are approximately the same length.

* * * * *

UNITED STATES PATENT AND TRADEMARK OFFICE
CERTIFICATE OF CORRECTION

PATENT NO. : 9,550,394 B2  
APPLICATION NO. : 14/226647  
DATED : January 24, 2017  
INVENTOR(S) : Paul E. Lew Page 1 of 1

It is certified that error appears in the above-identified patent and that said Letters Patent is hereby corrected as shown below:

In the Claims

Column 12, Line 40, Claim 2, change "across" to – "a cross"

Signed and Sealed this  
Fourth Day of April, 2017

Michelle K. Lee  
*Director of the United States Patent and Trademark Office*